US012801438B2

(12) United States Patent
Tu et al.

(10) Patent No.: US 12,801,438 B2
(45) Date of Patent: Nov. 17, 2026

(54) METHOD AND SYSTEM FOR OFFLOADING COMPUTING TASK IN VEHICLE

(71) Applicant: Xiamen Yaxon Zhilian Technology Co., Ltd., Xiamen (CN)

(72) Inventors: Yankai Tu, Xiamen (CN); Chaomin Wu, Xiamen (CN); Qingxi Chen, Xiamen (CN)

(73) Assignee: Xiamen Yaxon Zhilian Technology Co., Ltd., Xiamen (CN)

( * ) Notice: Subject to any disclaimer, the term of this patent is extended or adjusted under 35 U.S.C. 154(b) by 334 days.

(21) Appl. No.: 18/705,690

(22) PCT Filed: Sep. 27, 2022

(86) PCT No.: PCT/CN2022/121608

§ 371 (c)(1),
(2) Date: Apr. 29, 2024

(87) PCT Pub. No.: WO2023/236391

PCT Pub. Date: Dec. 14, 2023

(65) Prior Publication Data

US 2025/0013497 A1 Jan. 9, 2025

(30) Foreign Application Priority Data

Jun. 8, 2022 (CN) ........................ 202210646664.X

(51) Int. Cl.
*G06F 9/50* (2006.01)
*G06F 9/445* (2018.01)

(52) U.S. Cl.
CPC ............ *G06F 9/5027* (2013.01); *G06F 9/445* (2013.01); *G06F 2209/509* (2013.01)

(58) Field of Classification Search
CPC .. G06F 9/5027; G06F 9/445; G06F 2209/509; G06F 9/5083; G06F 9/5094;
(Continued)

(56) References Cited

U.S. PATENT DOCUMENTS 7,664,931 B2 * 2/2010 Erforth .................. G01C 21/36
712/42
7,685,192 B1 * 3/2010 Scofield ................ G06F 16/954
707/709
(Continued)

FOREIGN PATENT DOCUMENTS

CN 111818168 A 10/2020
CN 112685186 A 4/2021
CN 113709249 A 11/2021

OTHER PUBLICATIONS

International Search Report cited in PCT/CN2022/121608 mailed Mar. 1, 2023, 5 pages.

(Continued)

*Primary Examiner* — Adam Lee
(74) *Attorney, Agent, or Firm* — COOPER LEGAL GROUP LLC

(57) ABSTRACT

The present disclosure provides a method and system for offloading a computing task in a vehicle. When a data volume of a computing task in a first controller of a vehicle is greater than a preset maximum data volume, the data volume in the first controller is first sent to a second controller in the vehicle, the second controller calculates offloading information of the computing task in the first controller and sends the offloading information to the first controller, and the first controller performs task offloading based on the offloading information. Therefore, through task offloading between different controllers in the vehicle, the problem of insufficient computing power of the controller can be solved, and the higher real-time performance is achieved compared with cloud computing.

6 Claims, 2 Drawing Sheets

(58) Field of Classification Search
CPC ........... G06F 2209/5022; G06F 1/3206; G06F 1/3293; H04L 67/101; H04L 67/12; Y02D 10/00
USPC .......................................................... 718/104
See application file for complete search history.

(56) References Cited

U.S. PATENT DOCUMENTS

| | | | | |
|---|---|---|---|---|
| 9,734,119 | B1 * | 8/2017 | Chetverikov | G06F 13/4282 |
| 10,686,905 | B1 * | 6/2020 | Word | H04L 67/1097 |
| 11,445,400 | B2 * | 9/2022 | Zhang | H04L 43/0894 |
| 11,805,109 | B1 * | 10/2023 | Khare | H04L 63/0471 |
| 2006/0235615 | A1 * | 10/2006 | Kato | B60W 40/04 701/1 |
| 2012/0002543 | A1 * | 1/2012 | Dighe | H04L 47/125 370/232 |
| 2014/0043966 | A1 * | 2/2014 | Lee | H04W 28/0983 370/230 |
| 2014/0181311 | A1 * | 6/2014 | Hussein | H04L 67/1027 709/227 |
| 2016/0162004 | A1 * | 6/2016 | Ljubuncic | G06F 9/5083 713/320 |
| 2016/0283284 | A1 * | 9/2016 | Sun | G06F 1/329 |
| 2016/0378570 | A1 | 12/2016 | Ljubuncic et al. | |
| 2017/0332422 | A1 * | 11/2017 | Ohta | H04W 72/20 |
| 2018/0081854 | A1 * | 3/2018 | Joy | G06F 13/28 |
| 2018/0088931 | A1 * | 3/2018 | Caushi | G06F 8/654 |
| 2018/0199237 | A1 * | 7/2018 | Vare | H04W 4/42 |
| 2018/0324544 | A1 * | 11/2018 | Montemurro | H04L 5/0062 |
| 2018/0367453 | A1 * | 12/2018 | Li | H04L 45/60 |
| 2019/0229138 | A1 * | 7/2019 | Lee | H04N 25/53 |
| 2020/0145509 | A1 * | 5/2020 | Slik | H04L 67/63 |
| 2020/0183937 | A1 * | 6/2020 | Verma | G06F 16/24549 |
| 2020/0186964 | A1 * | 6/2020 | Lekutai | G08G 1/012 |
| 2020/0310679 | A1 * | 10/2020 | Charles | G06F 3/0689 |
| 2020/0409751 | A1 * | 12/2020 | Ould-Ahmed-Vall | G06F 12/0811 |
| 2021/0127300 | A1 * | 4/2021 | Cui | H04L 1/08 |
| 2021/0398364 | A1 * | 12/2021 | Tschache | G06F 8/71 |
| 2021/0400529 | A1 * | 12/2021 | Wang | H04L 1/02 |
| 2021/0406065 | A1 * | 12/2021 | Liu | G06F 18/217 |
| 2022/0256647 | A1 * | 8/2022 | Salmasi | H04L 67/12 |
| 2022/0355864 | A1 * | 11/2022 | Dalzell | B60Q 1/343 |
| 2022/0394586 | A1 * | 12/2022 | Chen | H04W 36/322 |
| 2023/0032183 | A1 * | 2/2023 | Kang | H04L 41/145 |
| 2023/0090549 | A1 * | 3/2023 | Kang | H04L 67/1008 709/219 |
| 2023/0185478 | A1 * | 6/2023 | Kommareddy | G06F 12/0802 711/118 |
| 2024/0103915 | A1 * | 3/2024 | Li | G06F 9/4893 |

OTHER PUBLICATIONS

Written Opinion cited in PCT/CN2022/121608 mailed Mar. 1, 2023, 3 pages.

* cited by examiner

METHOD AND SYSTEM FOR OFFLOADING COMPUTING TASK IN VEHICLE

CROSS-REFERENCE TO RELATED APPLICATIONS

This application claims priority to International Patent Application PCT/CN2022/121608, filed Sep. 27, 2022, which claims priority to Chinese Patent Application 202210646664.X, filed on Jun. 8, 2022. International Patent Application PCT/CN2022/121608 and Chinese Patent Application 202210646664.X are incorporated herein by reference.

TECHNICAL FIELD

The present disclosure relates to the technical field of task offloading, in particular to a method and system for offloading a computing task in a vehicle.

BACKGROUND

With the advent of the era of intelligent vehicles, the data volume and computation that vehicles need to process are growing exponentially. Intelligent sensors, high-definition maps, vehicle-to-everything (V2X) collaboration, augmented reality/virtual reality (AR/VR), and other applications make it more and more difficult for computing power of a single vehicle controller to cope with. If a vehicle-cloud architecture is uploaded to a cloud platform for processing computing tasks, the problems in consumption of network bandwidth and real-time performance of computing are hard to solve.

SUMMARY

In view of the technical problems to be solved, the present disclosure provides a method and system for offloading a task in a vehicle, which can improve the real-time performance of the computing task under the condition of meeting computing power for the computing task.

To solve the above technical problems, a technical solution adopted by the present disclosure is as follows:

A method for offloading a computing task in a vehicle includes the following steps:

determining, by a first controller in a vehicle, whether a data volume of a computing task is greater than a preset local maximum data volume, and if the data volume of the computing task is greater than the preset local maximum data volume, sending the data volume of the computing task to a second controller in the vehicle;

calculating, by the second controller, offloading information of the computing task based on the data volume of the computing task, and sending the offloading information to the first controller; and offloading, by the first controller, the computing task into the second controller based on the offloading information.

To solve the above technical problems, another technical solution adopted by the present disclosure is as follows:

A system for offloading a computing task in a vehicle includes a first controller and a second controller, where the first controller includes a first memory, a first processor, and a first computer program stored on the first memory and executable on the first processor; and the second controller includes a second memory, a second processor, and a second computer program stored on the second memory and executable on the second processor. The first processor, when executing the first computer program, implements the following steps:

determining whether a data volume of a computing task is greater than a preset local maximum data volume, and if the data volume of the computing task is greater than the preset local maximum data volume, sending the data volume of the computing task to the second controller in a vehicle; and offloading the computing task into the second controller based on offloading information.

The second processor, when executing the second computer program, implements the following steps:

calculating offloading information of the computing task based on the data volume of the computing task, and sending the offloading information to the first controller.

The present disclosure has the following beneficial effects: when the data volume of the computing task in the first controller of the vehicle is greater than the preset maximum data volume, the data volume in the first controller is first sent to the second controller in the vehicle, the second controller calculates the offloading information of the computing task in the first controller and sends the offloading information to the first controller, and the first controller performs task offloading based on the offloading information. Therefore, through task offloading between different controllers in the vehicle, the problem of insufficient computing power of the controller can be solved, and the higher real-time performance is achieved compared with cloud computing.

DESCRIPTION OF REFERENCE SIGNS

1. system for offloading computing task in vehicle; 2. first controller; 3. first memory; 4. first processor; 5. second controller; 6. second memory; and 7. second processor.

DESCRIPTION OF EMBODIMENTS

The technical content, achieved objectives and effects of the present disclosure are described in detail below with reference to the embodiments and the accompanying drawings.

Figure 1:
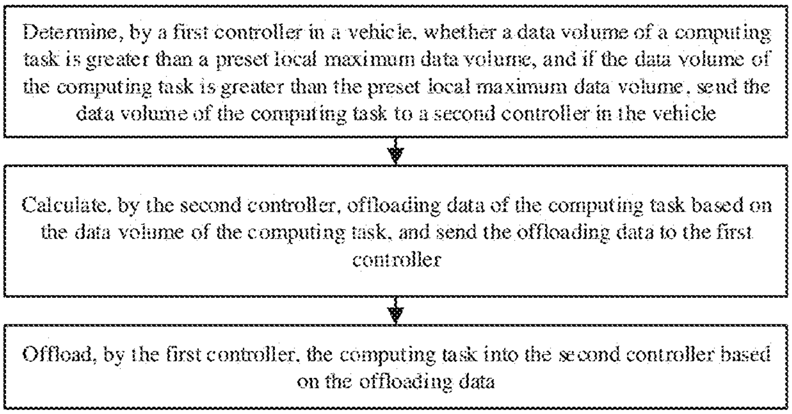
FIG. 1 is a flow diagram of a method for offloading a computing task in a vehicle according to an embodiment of the present disclosure.

Referring to FIG. 1, an embodiment of the present disclosure provides a method for offloading a computing task in a vehicle, including the following steps:

determining, by a first controller in a vehicle, whether a data volume of a computing task is greater than a preset local maximum data volume, and if the data volume of the computing task is greater than the preset local maximum data volume, sending the data volume of the computing task to a second controller in the vehicle;

calculating, by the second controller, offloading information of the computing task based on the data volume of the computing task, and sending the offloading information to the first controller; and offloading, by the first controller, the computing task into the second controller based on the offloading information.

It can be seen from the above description that the present disclosure has the following beneficial effects: when the data volume of the computing task in the first controller of the vehicle is greater than the preset maximum data volume, the data volume in the first controller is first sent to the second controller in the vehicle, the second controller calculates the offloading information of the computing task in the first controller and sends the offloading information to the first controller, and the first controller performs task offloading based on the offloading information. Therefore, through task offloading between different controllers in the vehicle, the problem of insufficient computing power of the controller can be solved, and the higher real-time performance is achieved compared with cloud computing.

Further, calculating, by the second controller, offloading information of the computing task based on the data volume for the computing task includes:

obtaining, by the second controller, formulas for a local computing delay and energy consumption and a task offloading total delay and energy consumption based on the data volume of the computing task; and forming, by the second controller, a task offloading objective function to minimize a delay, and solving the objective function to obtain offloading information, where the offloading information includes an offloading rate, a reserved bandwidth, and a resource allocated to the computing task.

It can be seen from the above description that the task offloading objective function is formed in the second controller to minimize a delay, such that the offloading rate, the reserved bandwidth, and the resource allocated to the computing task can be calculated, thereby making full use of computing resources in an in-vehicle network, and minimizing the total task delay of the controllers in the vehicle.

Further, obtaining, by the second controller, formulas for local computing delay and energy consumption based on the data volume of the computing task includes:

establishing the formula for the local computing delay:

$$T_{i,j}^{LOCAL} = \frac{(1 - x_{i,j})D_{i,j}c_k}{f_i};$$

where $x_{i,j}$ represents the offloading rate, $D_{i,j}$ represents a data volume to be processed by a current computing task j of a controller i, $c_k$ represents an instruction cycle required to process 1-bit data and is a known constant, and $f_i$ represents computing power of the first controller i and is a known constant; and establishing the formula for the local computing energy consumption:

$$E_{i,j}^{LOCAL} = (1 - x_{i,j})D_{i,j}c_kZ_i;$$

where $Z_i$ represents energy consumed by the first controller i in a single CPU instruction cycle and is a known constant.

It can be seen from the above description that the formulas for the local computing delay and energy consumption are established, such that it is convenient to establish the task offloading objective function subsequently in combination with the formulas.

Further, obtaining, by the second controller, formulas for task offloading total delay and energy consumption based on the data volume of the computing task includes:

establishing the formula for the task offloading total delay:

$$T_{i,j}^{EDGE} = T_{i,j}^{COM} + T_{i,j}^{TRAN};$$

$$T_{i,j}^{COM} = \frac{x_{i,j}D_{i,j}c_k}{f_{i,j}^M};$$

$$T_{i,j}^{TRAN} = 2t_{TSB}^B + 2t_{HPB}^B + 2t_{LPB}^B + (1+\varepsilon)t_{trans}^B;$$

where $$f_{i,j}^M$$

represents computing power allocated by the second controller to the task j in the first controller i, $t_{HPB}$ represents a high-priority traffic blocking delay, $t_{LPB}$ represents a low-priority traffic blocking delay, $t_{TSB}$ represents a traffic shaping delay, $t_{trans}$ represents a data frame transmission delay, and ε represents a ratio of a computing result to the data volume of the computing task; and establishing the formula for the task offloading energy consumption:

$$E_{i,j}^{EDGE} = x_{i,j}D_{i,j}[c_kZ_M + (1+\varepsilon)W_{i,j}];$$

where $Z_M$ represents energy consumed by the second controller in the single CPU instruction cycle and is a known constant, and $W_{i,j}$ represents energy required for the Ethernet to receive and transmit the 1-bit data and is a known constant.

It can be seen from the above description that the formulas for the task offloading total delay and energy consumption are established, such that it is convenient to establish the task offloading objective function subsequently in combination with the formulas.

Further, forming, by the second controller, a task offloading objective function to minimize a delay, and solving the objective function to obtain offloading information includes:

establishing the task offloading objective function to minimize the delay:

$$\left.\begin{array}{ll} \min & \{\max(T_{i,j}^{LOCAL}, T_{i,j}^{EDGE})\} \\ \text{s.t.} & C1: x_{i,j} \in [0,1] \\ & C2: 0 \le \sum_j f_{i,j}^M \le f^M \\ & C3: S_{idle}^A + S_{idle}^B < C \\ & C4: E_{i,j}^{LOCAL} + E_{i,j}^{EDGE} \le E_i^{MAX} \end{array}\right\};$$

where $$S_{idle}^A$$

represents a reduction rate of a credit value for class-A data, and $$S_{idle}^B$$

represents a reduction rate of a credit value for class-B data; and solving the task offloading objective function to calculate the offloading rate, the reserved bandwidth, and the resource allocated to the computing task.

It can be seen from the above description that the second controller evaluates a delay and an energy consumption cost of offloading the computing task in the first controller, and makes corresponding decisions on the offloading rate $x_{i,j}$, the reserved bandwidth $$S_{idle}^{B},$$

and the computing resource $$f_{i,j}^{M}$$

allocated by comparing costs of local computing and offloading computing, which can achieve the aim of minimizing a delay cost of in-vehicle computing.

Figure 2:
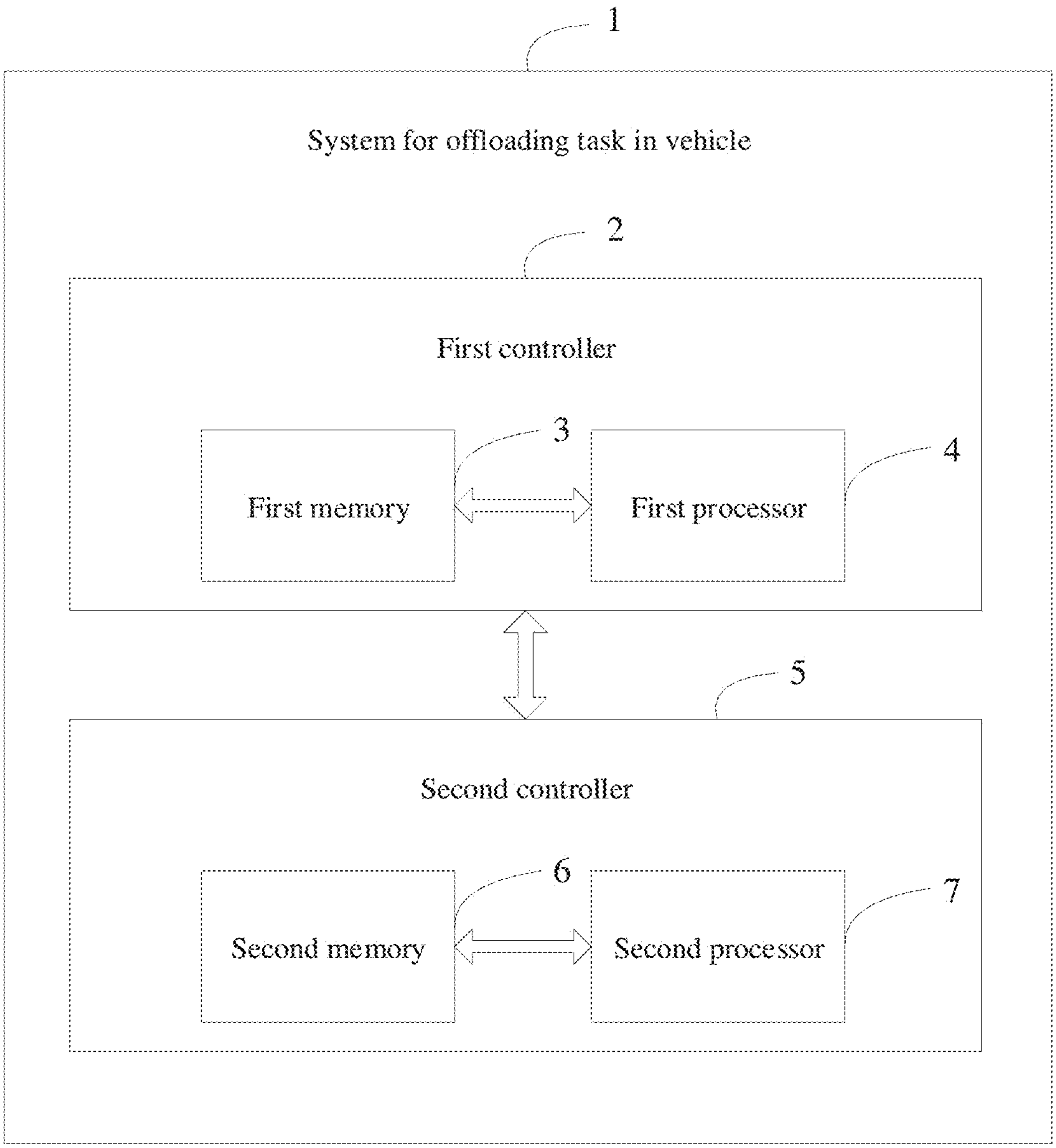
FIG. 2 is a schematic structural diagram of a system for offloading a computing task in a vehicle according to an embodiment of the present disclosure.

Referring to FIG. 2, another embodiment of the present disclosure provides a system for offloading a computing task in a vehicle, including a first controller and a second controller, where the first controller includes a first memory, a first processor, and a first computer program stored on the first memory and executable on the first processor; and the second controller includes a second memory, a second processor, and a second computer program stored on the second memory and executable on the second processor. The first processor, when executing the first computer program, implements the following steps:

determining whether a data volume of a computing task is greater than a preset local maximum data volume, and if the data volume of the computing task is greater than the preset local maximum data volume, sending the data volume of the computing task to the second controller in a vehicle; and offloading the computing task into the second controller based on offloading information.

The second processor, when executing the second computer program, implements the following steps:

calculating offloading information of the computing task based on the data volume of the computing task, and sending the offloading information to the first controller.

It can be seen from the above description that when the data volume of the computing task in the first controller of the vehicle is greater than the preset maximum data volume, the data volume in the first controller is first sent to the second controller in the vehicle, the second controller calculates the offloading information of the computing task in the first controller and sends the offloading information to the first controller, and the first controller performs task offloading based on the offloading information. Therefore, through task offloading between different controllers in the vehicle, the problem of insufficient computing power of the controller can be solved, and the higher real-time performance is achieved compared with cloud computing.

Further, calculating offloading information of the computing task based on the data volume of the computing task includes:

obtaining formulas for a local computing delay and energy consumption and a task offloading total delay and energy consumption based on the data volume of the computing task; and forming a task offloading objective function to minimize a delay, and solving the objective function to obtain offloading information, where the offloading information includes an offloading rate, a reserved bandwidth, and a resource allocated to the computing task.

It can be seen from the above description that the task offloading objective function is formed in the second controller to minimize a delay, such that the offloading rate, the reserved bandwidth, and the resource allocated to the computing task can be calculated, thereby making full use of computing resources in an in-vehicle network, and minimizing the total task delay of the controllers in the vehicle.

Further, obtaining formulas for local computing delay and energy consumption based on the data volume of the computing task includes:

establishing the formula for the local computing delay:

$$T_{i,j}^{LOCAL}=\frac{(1-x_{i,j})D_{i,j}c_k}{f_i};$$

where $x_{i,j}$ represents the offloading rate, $D_{i,j}$ represents a data volume to be processed by a current computing task j of a controller i, $c_k$ represents an instruction cycle required to process 1-bit data and is a known constant, and $f_i$ represents computing power of the first controller i and is a known constant; and establishing the formula for the local computing energy consumption:

$$E_{i,j}^{LOCAL}=(1-x_{i,j})D_{i,j}c_kZ_i;$$

where $Z_i$ represents energy consumed by the first controller i in a single CPU instruction cycle and is a known constant.

It can be seen from the above description that the formulas for the local computing delay and energy consumption are established, such that it is convenient to establish the task offloading objective function subsequently in combination with the formulas.

Further, obtaining formulas for task offloading total delay and energy consumption based on the data volume of the computing task includes:

establishing the formula for the task offloading total delay:

$$T_{i,j}^{EDGE}=T_{i,j}^{COM}+T_{i,j}^{TRAN};$$

$$T_{i,j}^{COM}=\frac{x_{i,j}D_{i,j}c_k}{f_{i,j}^{M}};$$

$$T_{i,j}^{TRAN}=2t_{TSB}^{B}+2t_{HPB}^{B}+2t_{LPB}^{B}+(1+\varepsilon)t_{trans}^{B};$$

where $$f_{i,j}^{M}$$

represents computing power allocated by the second controller to the task j in the first controller i, $t_{HPB}$ represents a high-priority traffic blocking delay, $t_{LPB}$ represents a low-priority traffic blocking delay, $t_{TSB}$ represents a traffic shaping delay, $t_{trans}$ represents a data frame transmission delay, and ε represents a ratio of a computing result to the data volume of the computing task; and establishing the formula for the task offloading energy consumption:

$$E_{i,j}^{EDGE} = x_{i,j} D_{i,j} [c_k Z_M + (1+\varepsilon) W_{i,j}];$$

where $Z_M$ represents energy consumed by the second controller in the single CPU instruction cycle and is a known constant, and $W_{i,j}$ represents energy required for the Ethernet to receive and transmit the 1-bit data and is a known constant.

It can be seen from the above description that the formulas for the task offloading total delay and energy consumption are established, such that it is convenient to establish the task offloading objective function subsequently in combination with the formulas.

Further, forming a task offloading objective function to minimize a delay, and solving the objective function to obtain offloading information includes:

establishing the task offloading objective function to minimize the delay:

$$\left.\begin{array}{ll} \min & \{\max(T_{i,j}^{LOCAL}, T_{i,j}^{EDGE})\} \\ \text{s.t.} & C1: x_{i,j} \in [0,1] \\ & C2: 0 \le \sum_j f_{i,j}^M \le f^M \\ & C3: S_{idle}^A + S_{idle}^B < C \\ & C4: E_{i,j}^{LOCAL} + E_{i,j}^{EDGE} \le E_i^{MAX} \end{array}\right\};$$

where $$S_{idle}^A$$

represents a reduction rate of a credit value for class-A data, and $$S_{idle}^B$$

represents a reduction rate of a credit value for class-B data; and solving the task offloading objective function to calculate the offloading rate, the reserved bandwidth, and the resource allocated to the computing task.

It can be seen from the above description that the second controller evaluates a delay and an energy consumption cost of offloading the computing task in the first controller, and makes corresponding decisions on the offloading rate $x_{i,j}$, the reserved bandwidth $$S_{idle}^B,$$

and the computing resource $$f_{i,j}^M$$

allocated by comparing costs of local computing and offloading computing, which can achieve the aim of minimizing a delay cost of in-vehicle computing.

The method and system for offloading a task in a vehicle according to the present disclosure are applicable to task offloading on intelligent vehicles, can improve the real-time performance of the computing task under the condition of meeting computing power for the computing task, and are described below by specific embodiments.

Embodiment 1

Referring to FIG. 1, a method for offloading a computing task in a vehicle includes steps below.

In S1, a first controller in a vehicle determines whether a data volume of a computing task is greater than a preset local maximum data volume, and sends, if the data volume of the computing task is greater than the preset local maximum data volume, the data volume of the computing task to a second controller in the vehicle.

In this embodiment, the first controller is a main controller, and the second controller is a central controller for audio and video entertainment.

Specifically, the first controller i presets a local computing maximum data volume $D_i$, and when a data volume to be processed by a computing task j is greater than $D_i$, the controller determines that the current controller in the vehicle has a large volume of computing data and a high computing delay, sends a total data volume $D_{i,j}$ of the current task to the central controller for audio and video entertainment, and requests for a computing resource for task offloading.

In S2, the second controller calculates offloading information of the computing task based on the data volume for the computing task, and sends the offloading information to the first controller.

Specifically, the central controller for audio and video entertainment stores software and hardware performance-related constants of the controllers in advance, and when a task offloading request from a new controller i is received, an objective function is established and optimal offloading rate $x_{i,j}$, reserved bandwidth $$S_{idle}^B,$$

and computing resource $$f_{i,j}^M$$

allocated are calculated.

In S21, a delay model for a task offloading information frame is built.

Originally, audio and video data is transmitted on a vehicle-mounted Ethernet bus based on an audio video bridging (AVB) protocol. Conventionally, the data has three levels, where a level A is a high priority corresponding to a highly real-time data stream, which is generally an audio and video data stream, a vehicle control signal frame, or the like; a level B is a second priority, and in this embodiment, this level is specially used as a data stream of computing task offloading class, and the level-A data and the level-B data are both processed by a shaping algorithm of the AVB protocol to ensure the real-time performance; and a level BE indicates that other data is transmitted in shaping data whenever possible by using a conventional Ethernet Best Effort mechanism, and this level is a lowest priority and does not participate in shaping.

Specifically, a delay of task offloading includes several parts such as an input waiting delay, a storage and forwarding delay, an interference delay, and a transmission delay, where the interference delay caused by a traffic conflict is a main delay. The interference delay includes five types of delays: a high-priority traffic blocking delay $t_{HPB}$, a same-priority traffic blocking delay $t_{SPB}$, a low-priority traffic blocking delay $t_{LPB}$, a traffic shaping delay $t_{TSB}$, and a data frame transmission delay $t_{trans}$.

Without considering the same-priority traffic blocking delay, the class-A data only includes three types of delays due to the highest priority. The traffic shaping delay $t_{TSB}$ thereof is a time to wait for a credit value $loCredit_A$ of the class-A data to restore to 0 in the shaping algorithm:

$$t_{TSB}^{A} = \left|\frac{loCredit_A}{S_{idle}^{A}}\right|;$$

where $$S_{idle}^{A}$$

is a reduction rate of the credit value and is generally equal to a preset bandwidth for sending the data of this level.

When the shaping algorithm allows the class-A data to be sent, a low-level data frame may be being transmitted, and it is required to wait for a low-level data packet to be sent. A computing formula for the delay $t_{LPB}$ is as follows:

$$t_{LPB}^{A} = \frac{M_{B,BE}}{C};$$

where C is an Ethernet bandwidth, and $M_{B,BE}$ is a length of the remaining data in the low-level data packet that has not been sent.

The transmission delay of the class-A data itself is as follows:

$$t_{trans}^{A} = \frac{M_A}{C},$$

where MA is a length of a class-A data frame that is sent currently. Therefore, a delay $$W_A = t_{TSB}^{A} + t_{LPB}^{A} + t_{trans}^{A}$$

of the class-A data can be obtained.

For a class-B task offloading information frame, a traffic shaping delay $$t_{TSB}^{B}$$

is as follows:

$$t_{TSB}^{B} = \left|\frac{loCredit_B}{S_{idle}^{B}}\right|;$$

A computing formula for the low-priority traffic blocking delay is as follows:

$$t_{LPB}^{B} = \frac{M_{BE}}{C};$$

A transmission delay thereof is as follows:

$$t_{trans}^{B} = \frac{M_B}{C};$$

When the class-B data frame is shaped and can be sent, considering that there may be a length of part of the class-A data frame that has not yet been transmitted, high-priority traffic blocking is generated:

$$t_{HPB}^{B} = W_A - t_{LPB}^{A};$$

Therefore, a delay of the computing task offloading information frame can be obtained:

$$W_B = t_{TSB}^{B} + t_{HPB}^{B} + t_{LPB}^{B} + t_{trans}^{B}.$$

In S22, the second controller obtains formulas for a local computing delay and energy consumption and a task offloading total delay and energy consumption based on the data volume of the computing task.

Specifically, a task offloading rate is set to $x_{i,j}$, $0 \le x_{i,j} \le 1$, which represents a proportion of a $j^{th}$ computing task in the first controller i that is offloaded to the central controller for audio and video entertainment. The remaining computing tasks of $(1-x_{i,j})$ are left in the first controller locally for computation. The local delay is as follows:

$$T_{i,j}^{LOCAL} = \frac{(1 - x_{i,j})D_{i,j}c_k}{f_i};$$

where $D_{i,j}$ represents a length of data that needs to be computed by the task, $c_k$ is in cycles/bit, is an instruction cycle required to process 1-bit data and determined by an algorithm of a controller, and is a known constant because the algorithm is a fixed program, and $f_i$ is in cycles/second, represents computing power of the first controller i, and is a constant determined by a computing chip of the controller.

The local computing energy consumption $E_{i,j}$ is as follows:

$$E_{i,j}^{LOCAL} = (1 - x_{i,j})D_{i,j}c_k Z_i;$$

where $Z_i$ is in J/cycle, represents energy consumed by the first controller in a single CPU instruction cycle, and is a constant determined by chip hardware of the controller.

A computing delay of task offloading is as follows:

$$T_{i,j}^{COM} = \frac{x_{i,j} D_{i,j} c_k}{f_{i,j}^{M}};$$

where $$f_{i,j}^{M}$$

represents computing power allocated by the central controller for audio and video entertainment to a task j in a controller i, with the same unit as $f_i$.

Therefore, a total transmission delay of task offloading is a sum of a time for data to be transmitted to the central controller for audio and video entertainment and a time for a data computing result to be transmitted back to the controller from the central controller:

$$T_{i,j}^{TRAN} = 2t_{TSB}^{B} + 2t_{HPB}^{B} + 2t_{LPB}^{B} + (1+\varepsilon)t_{trans}^{B};$$

where ε is a ratio of the computing result to the data volume of the computing task. A data length of the computing result is generally much less than an original length of computing data, and lengths of computing results in most algorithms are all known, for example, a computing result in an MD5 algorithm is a fixed 16-byte hash value, so E is a constant based on different algorithms. Therefore, the task offloading total delay is as follows:

$$T_{i,j}^{EDGE} = T_{i,j}^{COM} + T_{i,j}^{TRAN};$$

the energy consumption $E_{i,j}$ for task offloading computing is as follows:

$$E_{i,j}^{EDGE} = x_{i,j} D_{i,j} [c_k Z_M + (1+\varepsilon) W_{i,j}].$$

In S23, the second controller forms a task offloading objective function to minimize a delay, and calculates offloading information based on the objective function, where the offloading information includes an offloading rate, a reserved bandwidth, and a resource allocated to the computing task.

Specifically, the central controller for audio and video entertainment evaluates a delay and an energy consumption cost of offloading the computing task in the first controller, and makes corresponding decisions on the offloading rate $x_{i,j}$, the reserved bandwidth $$S_{idle}^{B},$$

and the computing resource $$f_{i,j}^{M}$$

allocated by comparing costs of local computing and offloading computing, thereby achieving the aim of minimizing a delay cost of in-vehicle computing. Moreover, if it is assumed that the designed maximum energy consumption of the controller i is $$E_i^{MAX},$$

the total energy consumption after offloading computing cannot exceed an upper limit of the designed maximum energy consumption of the controller itself.

So an optimized objective function is formed:

$$\left.\begin{aligned} \min\{\max(T_{i,j}^{LOCAL}, T_{i,j}^{EDGE})\} \\ \text{s.t. } C1: x_{i,j} \in [0, 1] \\ C2: 0 \le \sum_j f_{i,j}^{M} \le f^{M} \\ C3: S_{idle}^{A} + S_{idle}^{B} < C \\ C4: E_{i,j}^{LOCAL} + E_{i,j}^{EDGE} \le E_i^{MAX} \end{aligned}\right\}.$$

This is a single objective optimization problem involving multiple variables. There are many well-known methods for solving the optimization problem of an objective equation. In the present disclosure, a genetic algorithm can be used for optimization solving to obtain the decision on the offloading rate $x_{i,j}$ the reserved bandwidth $$S_{idle}^{B},$$

and the computing resource $$f_{i,j}^{M}$$

allocated which meet optimization conditions of the objective function.

In S3, the first controller offloads the computing task into the second controller based on the offloading information.

Specifically, the central controller for audio and video entertainment informs the controller of the offloading rate $x_{i,j}$ and the reserved bandwidth $$S_{idle}^{B},$$

and the controller determines how much data to be processed by the computing task needs to be transmitted to the central controller for audio and video entertainment by the offloading rate $x_{i,j}$, and sends it over Ethernet by the reserved bandwidth $$S_{idle}^{B}.$$

Embodiment 2

Referring to FIG. 2, a system 1 for offloading a computing task in a vehicle includes a first controller 2 and a second controller 5, where the first controller 2 includes a first memory 3, a first processor 4, and a first computer program stored on the first memory 3 and executable on the first processor 4; and the second controller 5 includes a second memory 6, a second processor 7, and a second computer program stored on the second memory 6 and executable on the second processor 7. The first processor 4, when executing the first computer program, implements the following steps:

determining whether a data volume of a computing task is greater than a preset local maximum data volume, and if the data volume of the computing task is greater than the preset local maximum data volume, sending the data volume of the computing task to a second controller in a vehicle; and offloading the computing task into the second controller based on offloading information.

The second processor 7, when executing the second computer program, implements the following steps:

calculating offloading information of the computing task based on the data volume of the computing task, and sending the offloading information to the first controller.

In some embodiments, calculating offloading information of the computing task based on the data volume of the computing task includes:

obtaining formulas for a local computing delay and energy consumption and a task offloading total delay and energy consumption based on the data volume of the computing task; and forming a task offloading objective function to minimize a delay, and solving the objective function to obtain offloading information, where the offloading information includes an offloading rate, a reserved bandwidth, and a resource allocated to the computing task.

In some embodiments, obtaining formulas for local computing delay and energy consumption based on the data volume of the computing task includes:

establishing the formula for the local computing delay:

$$T_{i,j}^{LOCAL} = \frac{(1 - x_{i,j})D_{i,j}c_k}{f_i};$$

where $x_{i,j}$ represents the offloading rate, $D_{i,j}$ represents a data volume to be processed by a current computing task j of a controller i, $c_k$ represents an instruction cycle required to process 1-bit data and is a known constant, and $f_i$ represents computing power of the first controller i and is a known constant; and establishing the formula for the local computing energy consumption:

$$E_{i,j}^{LOCAL} = (1 - x_{i,j})D_{i,j}c_kZ_i;$$

where $Z_i$ represents energy consumed by the first controller i in a single CPU instruction cycle and is a known constant.

In some embodiments, obtaining formulas for task offloading total delay and energy consumption based on the data volume of the computing task includes:

establishing the formula for the task offloading total delay:

$$T_{i,j}^{EDGE} = T_{i,j}^{COM} + T_{i,j}^{TRAN};$$

$$T_{i,j}^{COM} = \frac{x_{i,j}D_{i,j}c_k}{f_{i,j}^M};$$

$$T_{i,j}^{TRAN} = 2t_{TSB}^B + 2t_{HPB}^B + 2t_{LPB}^B + (1 + \varepsilon)t_{trans}^B;$$

where $$f_{i,j}^M$$

represents computing power allocated by the second controller to the task j in the first controller i, $t_{HPB}$ represents a high-priority traffic blocking delay, $t_{LPB}$ represents a low-priority traffic blocking delay, $t_{TSB}$ represents a traffic shaping delay, $t_{trans}$ represents a data frame transmission delay, and ε represents a ratio of a computing result to the data volume of the computing task; and establishing the formula for the task offloading energy consumption:

$$E_{i,j}^{EDGE} = x_{i,j}D_{i,j}[c_kZ_M + (1 + \varepsilon)W_{i,j}];$$

where $Z_M$ represents energy consumed by the second controller in the single CPU instruction cycle and is a known constant, and $W_{i,j}$ represents energy required for the Ethernet to receive and transmit the 1-bit data and is a known constant.

In some embodiments, forming a task offloading objective function to minimize a delay, and solving the objective function to obtain offloading information includes:

establishing the task offloading objective function to minimize the delay:

$$\left.\begin{aligned} &\min\{\max(T_{i,j}^{LOCAL}, T_{i,j}^{EDGE})\} \\ &\text{s.t. } C1: x_{i,j} \in [0, 1] \\ &C2: 0 \le \sum_j f_{i,j}^M \le f^M \\ &C3: S_{idle}^A + S_{idle}^B < C \\ &C4: E_{i,j}^{LOCAL} + E_{i,j}^{EDGE} \le E_i^{MAX} \end{aligned}\right\};$$

where $$S_{idle}^A$$

represents a reduction rate of a credit value for class-A data, and $$S_{idle}^B$$

represents a reduction rate of a credit value for class-B data; and solving the task offloading objective function to calculate the offloading rate, the reserved bandwidth, and the resource allocated to the computing task.

In summary, in the method and system for offloading a computing task in a vehicle provided by the present disclosure, when the data volume of the computing task in the first controller of the vehicle is greater than the preset maximum data volume, the data volume in the first controller is first sent to the second controller in the vehicle, the second controller calculates the offloading information of the computing task in the first controller and sends the offloading information to the first controller, and the first controller performs task offloading based on the offloading information. Therefore, through task offloading between different controllers in the vehicle, the problem of insufficient computing power of the controller can be solved, and the higher real-time performance is achieved compared with cloud computing.

The above descriptions are only the embodiments of the present disclosure, rather than limiting the scope of patent of the present disclosure. Any equivalent transformations made using the content of the specification and the accompanying drawings of the present disclosure, directly or indirectly applied in related technical fields, are similarly included in the scope of patent protection of the present disclosure.

The invention claimed is:

1. A method for offloading a computing task in a vehicle, comprising:

sending a data volume of the computing task from a first controller in the vehicle to a second controller in the vehicle when the data volume of the computing task is greater than a preset local maximum data volume;

sending, by the second controller, offloading information to the first controller, wherein the offloading information is based on the data volume of the computing task; and offloading, by the first controller, the computing task into the second controller based on the offloading information, wherein:

a local computing delay, a local computing energy consumption, a task offloading total delay, and a task offloading energy consumption are based on the data volume of the computing task;

the offloading information is based on a solution to a task offloading objective function that minimizes the task offloading total delay;

the offloading information comprises an offloading rate, a reserved bandwidth, and a resource allocated to the computing task;

wherein obtaining, by the second controller, the formulas for the local computing delay and the local computing energy consumption based on the data volume of the computing task comprises:

the local computing delay is defined as:

$$T_{i,j}^{LOCAL} = \frac{(1 - x_{i,j})D_{i,j}c_k}{f_i};$$

where $X_{ij}$ represents the offloading rate, $D_{ij}$ represents a data volume to be processed by a current computing task i of the first controller i, $c_k$ represents an instruction cycle required to process 1-bit data and is a first known constant, and $f_i$ represents computing power of the first controller i and is a second known constant; and the local computing energy consumption is defined as:

$$E_{i,j}^{LOCAL} = (1 - x_{i,j})D_{i,j}c_k Z_i;$$

where $Z_i$ represents energy consumed by the first controller i in a single central processing unit (CPU) instruction cycle and is a third known constant.

2. The method for offloading a computing task in a vehicle according to claim 1, wherein the task offloading total delay and the task offloading energy consumption based on the data volume of the computing task are defined as:

$$T_{i,j}^{EDGE} = T_{i,j}^{COM} + T_{i,j}^{TRAN};$$

$$T_{i,j}^{COM} = \frac{x_{i,j}D_{i,j}c_k}{f_{i,j}^M};$$

$$T_{i,j}^{TRAN} = 2t_{TSB}^B + 2t_{HPB}^B + 2t_{LPB}^B + (1+\varepsilon)t_{trans}^B;$$

wherein $T_{ij}^{COM}$ represents computing delay of task offloading, $T_{ij}^{TRAN}$ represents total transmission delay of the task offloading, $f_{ij}^M$ represents computing power allocated by the second controller to the current computing task j of the first controller i, $t_{HPB}$ represents a high-priority traffic blocking delay, $t_{LPB}$ represents a low-priority traffic blocking delay, $t_{TSB}$ represents a traffic shaping delay, $t_{trans}$ represents a data frame transmission delay, and ε represents a ratio of a computing result to the data volume of the computing task; and wherein the task offloading energy consumption is defined as:

$$E_{i,j}^{EDGE} = x_{i,j}D_{i,j}[c_k Z_M + (1+\varepsilon)W_{i,j}];$$

wherein $Z_M$ represents energy consumed by the second controller in the single CPU instruction cycle and is a fourth known constant, and $W_{ij}$ represents energy required for Ethernet to receive and transmit the 1-bit data and is a fifth known constant.

3. The method for offloading a computing task in a vehicle according to claim 2, wherein the task offloading objective function to minimize the task offloading total delay is defined as:

$$\left.\begin{array}{c} \min\{\max(T_{i,j}^{LOCAL}, T_{i,j}^{EDGE})\} \\ \text{s.t. } C1: x_{i,j} \in [0,1] \\ C2: 0 \le \sum_j f_{i,j}^M \le f^M \\ C3: S_{idle}^A + S_{idle}^B < C \\ C4: E_{i,j}^{LOCAL} + E_{i,j}^{EDGE} \le E_i^{MAX} \end{array}\right\};$$

wherein $S^A_{idle}$ represents a reduction rate of a credit value for class-A data, and $S^P_{idle}$ represents a reduction rate of a credit value for class-B data; and the offloading rate, the reserved bandwidth, and the resource allocated to the computing task are based on a solution to the task offloading objective function.

4. A system for offloading a computing task in a vehicle, comprising a first controller and a second controller, the first controller comprising a first memory, a first processor, and a first computer program stored on the first memory and executable on the first processor, the second controller comprising a second memory, a second processor, and a second computer program stored on the second memory and executable on the second processor, wherein the first processor, when executing the first computer program, implements the following operations:

sending a data volume of the computing task from the first controller in the vehicle to the second controller in the vehicle when the data volume of the computing task is greater than a preset local maximum data volume; and offloading, by the first controller, the computing task into the second controller based on the offloading information;

wherein the second processor, when executing the second computer program, implements the following operations:

sending, by the second controller, the offloading information to the first controller, wherein the offloading information is based on the data volume of the computing task, wherein:

a local computing delay, a local computing energy consumption, a task offloading total delay, and a task offloading energy consumption are based on the data volume of the computing task;

the offloading information is based on a solution to a task offloading objective function that minimizes the task offloading total delay;

the offloading information comprises an offloading rate, a reserved bandwidth, and a resource allocated to the computing task;

the local computing delay is defined as:

$$T_{i,j}^{LOCAL} = \frac{(1 - x_{i,j})D_{i,j}c_k}{f_i};$$

where $x_{i,j}$ represents the offloading rate, $D_{ij}$ represents a data volume to be processed by a current computing task i of the first controller i, $c_k$ represents an instruction cycle required to process 1-bit data and is a first known constant, and $f_i$ represents computing power of the first controller i and is a second known constant; and the local computing energy consumption is defined as:

$$E_{i,j}^{LOCAL} = (1 - x_{i,j})D_{i,j}c_kZ_i;$$

where $Z_i$ represents energy consumed by the first controller i in a single central processing unit (CPU) instruction cycle and is a third known constant.

5. The system for offloading a computing task in a vehicle according to claim 4, wherein the task offloading total delay and the task offloading energy consumption based on the data volume of the computing task are defined as:

$$T_{i,j}^{EDGE} = T_{i,j}^{COM} + T_{i,j}^{TRAN};$$

$$T_{i,j}^{COM} = \frac{x_{i,j}D_{i,j}c_k}{f_{i,j}^M};$$

$$T_{i,j}^{TRAN} = 2t_{TSB}^B + 2t_{HPB}^B + 2t_{LPB}^B + (1+\varepsilon)t_{trans}^B;$$

wherein $T_{ij}^{COM}$ represents computing delay of task offloading, $T_{ij}^{TRAN}$ represents total transmission delay of the task offloading, $f_{ij}$ represents computing power allocated by the second controller to the current computing task j of the first controller i, $t_{HPB}$ represents a high-priority traffic blocking delay, $t_{LPB}$ represents a low-priority traffic blocking delay, $t_{TSB}$ represents a traffic shaping delay, $t_{trans}$ represents a data frame transmission delay, and $\varepsilon$ represents a ratio of a computing result to the data volume of the computing task; and wherein the task offloading energy consumption is defined as:

$$E_{i,j}^{EDGE} = x_{i,j}D_{i,j}[c_kZ_M + (1+\varepsilon)\,W_{i,j}];$$

wherein $Z_M$ represents energy consumed by the second controller in the single CPU instruction cycle and is a fourth known constant, and $W_{ij}$ represents energy required for Ethernet to receive and transmit the 1-bit data and is a fifth known constant.

6. The system for offloading a computing task in a vehicle according to claim 5, wherein the task offloading objective function to minimize the task offloading total delay is defined as:

$$\left.\begin{array}{c} \min\{\max(T_{i,j}^{LOCAL}, T_{i,j}^{EDGE})\} \\ \text{s.t. } C1: x_{i,j} \in [0,1] \\ C2: 0 \le \sum_j f_{i,j}^M \le f^M \\ C3: S_{idle}^A + S_{idle}^B < C \\ C4: E_{i,j}^{LOCAL} + E_{i,j}^{EDGE} \le E_i^{MAX} \end{array}\right\};$$

wherein $S^A_{idle}$ represents a reduction rate of a credit value for class-A data, and $S^P_{idle}$ represents a reduction rate of a credit value for class-B data; and the offloading rate, the reserved bandwidth, and the resource allocated to the computing task are based on a solution to the task offloading objective function.

* * * * *